(12) United States Patent
Marsh et al.

(10) Patent No.: US 11,016,219 B2
(45) Date of Patent: May 25, 2021

(54) DELTA ENCODING OF DOWNHOLE IMAGES OF PETROPHYSICAL ROCK PROPERTIES

(71) Applicant: Halliburton Energy Services, Inc., Houston, TX (US)

(72) Inventors: Laban M. Marsh, Houston, TX (US); Paul F. Rodney, Spring, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 0 days.

(21) Appl. No.: 16/475,552

(22) PCT Filed: Mar. 1, 2017

(86) PCT No.: PCT/US2017/020233
§ 371 (c)(1),
(2) Date: Jul. 2, 2019

(87) PCT Pub. No.: WO2018/160176
PCT Pub. Date: Sep. 7, 2018

(65) Prior Publication Data
US 2020/0241166 A1 Jul. 30, 2020

(51) Int. Cl.
*E21B 47/024* (2006.01)
*E21B 47/20* (2012.01)
(Continued)

(52) U.S. Cl.
CPC ........ *G01V 11/002* (2013.01); *E21B 47/0025* (2020.05); *E21B 47/024* (2013.01);
(Continued)

(58) Field of Classification Search
CPC .......... G01V 11/002; G01V 3/38; G01V 5/04; E21B 47/00; E21B 47/0025; E21B 47/20; E21B 47/24; E21B 49/00; H04N 19/103
(Continued)

(56) References Cited

U.S. PATENT DOCUMENTS

| | | | | |
|---|---|---|---|---|
| 4,453,219 A | * | 6/1984 | Clavier | ................. E21B 47/026 324/333 |
| 5,467,832 A | * | 11/1995 | Orban | ..................... E21B 7/068 175/45 |

(Continued)

OTHER PUBLICATIONS

International Search Report and the Written Opinion, dated Jan. 2, 2018, PCT/US2017/020233, 9 pages, ISA/KR.
(Continued)

*Primary Examiner* — Jeffrey P Aiello

(57) ABSTRACT

System and methods for encoding downhole image data are provided. Measurements collected by a downhole tool around a circumference of a borehole drilled within a formation are obtained. The acquired measurements are assigned to a plurality of azimuthal bins. Each azimuthal bin corresponds to an angular sector around the circumference of the borehole in which at least one of the measurements was collected by the downhole tool at a predetermined depth within the formation. At least one of a plurality of delta encoding schemes is selected for encoding the measurements assigned to the plurality of azimuthal bins. A delta-encoded binary representation of the measurements assigned to the plurality of bins is generated, based on the selected delta encoding scheme. The generated delta-encoded binary representation is transmitted from the downhole computing device to a surface computing device located at the surface of the borehole.

20 Claims, 9 Drawing Sheets

(51) Int. Cl.
  *E21B 49/00* (2006.01)
  *G01V 11/00* (2006.01)
  *H04N 19/103* (2014.01)
  *E21B 47/002* (2012.01)

(52) U.S. Cl.
  CPC .............. *E21B 47/20* (2020.05); *E21B 49/00* (2013.01); *H04N 19/103* (2014.11)

(58) Field of Classification Search
  USPC ............ 175/45, 50; 324/388; 702/6, 8–9, 11
  See application file for complete search history.

(56) References Cited

U.S. PATENT DOCUMENTS

| | | | | |
|---|---|---|---|---|
| 6,337,684 B1 * | 1/2002 | Dyer | ................ | G06T 9/001 345/419 |
| 6,405,136 B1 * | 6/2002 | Li | ................ | H03M 7/30 702/10 |
| 7,068,182 B2 * | 6/2006 | Golla | ................ | E21B 47/18 340/853.1 |
| 7,697,049 B1 * | 4/2010 | Lavi | ................ | H04N 5/3452 348/305 |
| 8,115,651 B2 * | 2/2012 | Camwell | ................ | E21B 47/12 340/853.2 |
| 8,798,384 B2 * | 8/2014 | Le | ................ | G01V 3/20 382/250 |
| 9,507,047 B1 * | 11/2016 | Dvorkin | ................ | G01V 5/101 |
| 2001/0050682 A1 * | 12/2001 | Deering | ................ | G06T 9/001 345/420 |
| 2003/0101806 A1 | 6/2003 | Kurkoski | | |
| 2007/0223822 A1 | 9/2007 | Haugland | | |
| 2009/0030616 A1 | 1/2009 | Sugiura | | |
| 2010/0049443 A1 | 2/2010 | Mickael | | |
| 2010/0073190 A1 | 3/2010 | Fanini et al. | | |
| 2011/0161009 A1 * | 6/2011 | Wang | ................ | G01V 1/48 702/9 |
| 2012/0001637 A1 * | 1/2012 | Bittar | ................ | G01V 3/28 324/339 |
| 2012/0111559 A1 | 5/2012 | Deady et al. | | |
| 2017/0060769 A1 * | 3/2017 | Wires | ................ | H04L 12/6418 |
| 2017/0082724 A1 * | 3/2017 | Brousard | ................ | H01Q 3/34 |

OTHER PUBLICATIONS

Lamont-Doherty Earth Observatory—The Earth Institute at Columbia University, "An Introduction to Logging While Drilling," *Seminar in Marine* Geophysics, Feb. 14, 2008, http://www.ldeo.columbia.edu/res/diy/mgg/lodos/Education/Logging/slides/LWD_Feb_15_2008.pdf.

* cited by examiner

DELTA ENCODING OF DOWNHOLE IMAGES OF PETROPHYSICAL ROCK PROPERTIES

CROSS-REFERENCE TO RELATED APPLICATION

The present application is a U.S. National Stage patent application of International Patent Application No. PCT/US2017/020233, filed on Mar. 1, 2017, the benefit of which is claimed and the disclosure of which is incorporated herein by reference in its entirety.

FIELD OF THE DISCLOSURE

The present disclosure relates generally to electronic transmission of downhole data during drilling operations, and more particularly, to data compression techniques for electronic transmission of downhole data during drilling operations.

BACKGROUND

When drilling an oil and gas well, it is often desirable to use "logging-while-drilling" (LWD) or "measurement-while-drilling" (MWD) sensors in the drill string to gather information downhole while the well is being drilled. Such information may include measurements of subsurface formation characteristics collected by the sensors as the borehole is drilled, along with data relating to the size and configuration of the borehole itself. Data from around the borehole can also be used to produce an image log that provides a drilling operator with an "image" of the circumference of the borehole with respect to one or more formation characteristics.

While drilling is in progress, the LWD/MWD sensors in the drill string may continuously or intermittently transmit the information gathered downhole to a surface detector or data processing device by some form of telemetry. For example, in mud pulse telemetry, downhole data is transmitted in the form of pressure pulses that propagate through the drilling fluid to the surface, where they are detected by various types of transducers. However, due to data bandwidth and downhole storage limitations in LWD/MWD systems, it may not be possible to send all of the information gathered downhole to the surface. For example, in cases where the data acquisition rate by a downhole device is greater than the effective transmission rate, only a fraction of the data collected by the downhole sensors may get sent to the surface.

Data compression techniques may be utilized to reduce the size of the downhole data before it gets sent to the surface and thereby increase the effective data transmission rate. However, the amount of data size reduction offered by conventional data compression techniques may not be enough to sufficiently increase the effective transmission rate without unduly sacrificing data quality.

DESCRIPTION OF ILLUSTRATIVE EMBODIMENTS

Figure 1:
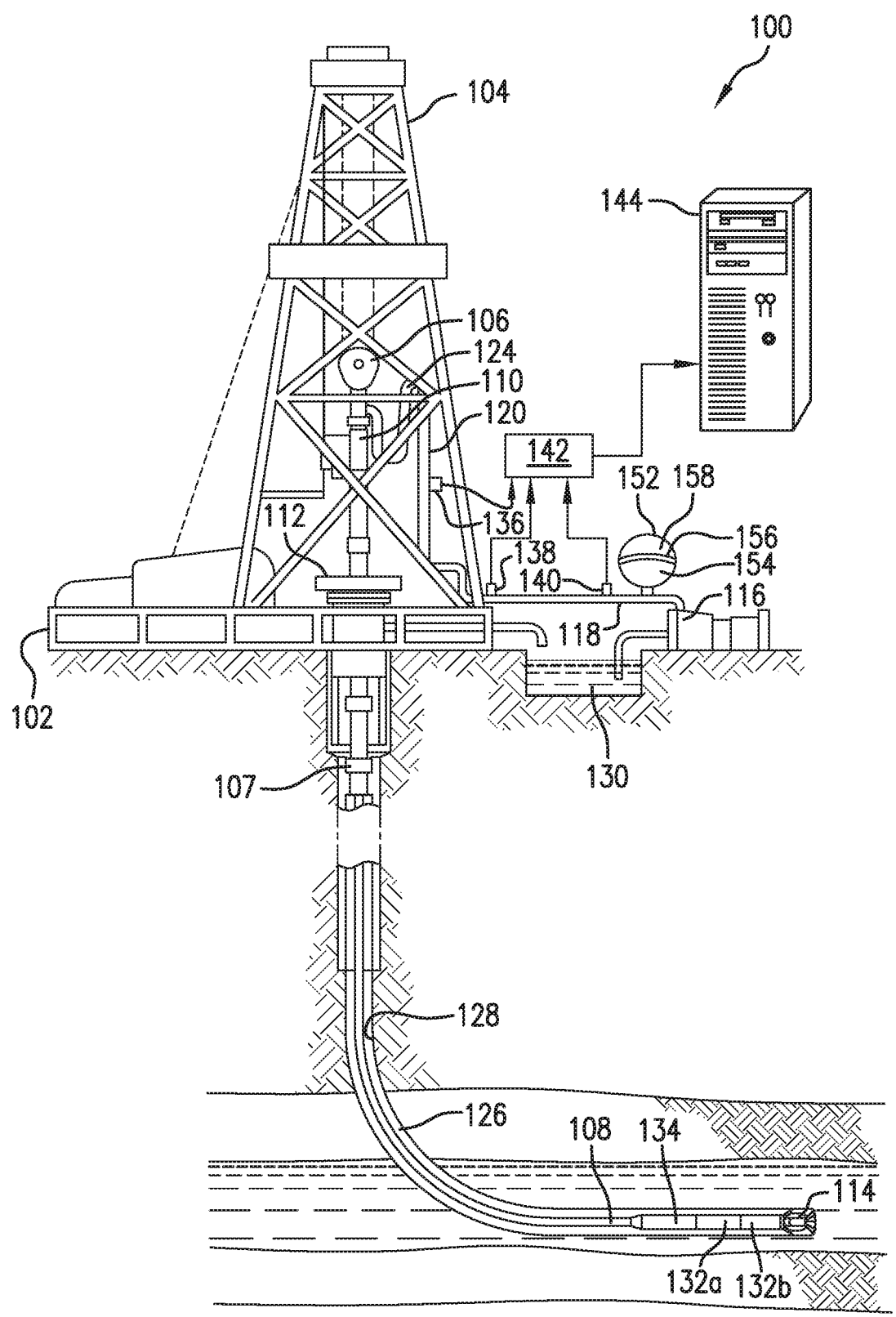
FIG. 1 is a diagram of an illustrative drilling system including a drilling platform operating a downhole drilling assembly.

Embodiments of the present disclosure relate to adaptively encoding borehole image data according to an optimal delta encoding scheme selected for the particular data being encoded. While the present disclosure is described herein with reference to illustrative embodiments for particular applications, it should be understood that embodiments are not limited thereto. Other embodiments are possible, and modifications can be made to the embodiments within the spirit and scope of the teachings herein and additional fields in which the embodiments would be of significant utility.

In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described. It would also be apparent to one skilled in the relevant art that the embodiments, as described herein, can be implemented in many different embodiments of software, hardware, firmware, and/or the entities illustrated in the figures. Any actual software code with the specialized control of hardware to implement embodiments is not limiting of the detailed description. Thus, the operational behavior of embodiments will be described with the understanding that modifications and variations of the embodiments are possible, given the level of detail presented herein.

The disclosure may repeat reference numerals and/or letters in the various examples or Figures. This repetition is for the purpose of simplicity and clarity and does not in itself dictate a relationship between the various embodiments and/or configurations discussed. Further, spatially relative terms, such as beneath, below, lower, above, upper, uphole, downhole, upstream, downstream, and the like, may be used herein for ease of description to describe one element or feature's relationship to another element(s) or feature(s) as illustrated, the upward direction being toward the top of the corresponding figure and the downward direction being toward the bottom of the corresponding figure, the uphole direction being toward the surface of the wellbore, the downhole direction being toward the toe of the wellbore. Unless otherwise stated, the spatially relative terms are intended to encompass different orientations of the apparatus in use or operation in addition to the orientation depicted in the Figures. For example, if an apparatus in the Figures is turned over, elements described as being "below" or "beneath" other elements or features would then be oriented "above" the other elements or features. Thus, the exemplary term "below" can encompass both an orientation of above and below. The apparatus may be otherwise oriented (rotated 90 degrees or at other orientations) and the spatially relative descriptors used herein may likewise be interpreted accordingly.

Also, while a Figure may depict a horizontal wellbore or a vertical wellbore, unless indicated otherwise, it should be understood by those skilled in the art that the apparatus according to the present disclosure is equally well suited for use in wellbores having other orientations including vertical wellbores, slanted wellbores, multilateral wellbores or the like. Likewise, unless otherwise noted, even though a Figure may depict an onshore operation, it should be understood by those skilled in the art that the apparatus according to the present disclosure is equally well suited for use in offshore operations. Further, unless otherwise noted, even though a Figure may depict a cased hole, it should be understood by those skilled in the art that the apparatus according to the present disclosure is equally well suited for use in open hole operations.

Illustrative embodiments and related methodologies of the present disclosure will be described below in reference to FIGS. 1-10 as they might be employed, for example, in a downhole device for encoding and transmitting downhole data to the surface during a drilling operation. The downhole device may be, for example, a data encoder integrated within a telemetry unit or a bus controller of a bottom hole assembly (BHA) located at the end of a drill string disposed within a borehole being drilled through a subsurface formation. Such a device may be communicatively coupled to a "logging-while-drilling" (LWD) or "measurement-while-drilling" (MWD) tool for acquiring formation property measurements collected by the LWD/MWD tool over the course of the drilling operation. The LWD/MWD downhole tool may be used to measure formation properties at different depths within the formation as the borehole is drilled. Such measurements may be collected by the downhole tool around a section of the borehole to obtain an "image" of the borehole section with respect to one or more formation characteristics at a current depth of the downhole tool. In one or more embodiments, such image data may be collected as the tool rotates within the borehole and binned into a plurality of azimuthal bins according to the azimuthal direction in which the tool was positioned when the data was acquired. For example, image data may be collected as a set of measured pairs including a formation property measurement and a corresponding angle or azimuthal position of the tool around the circumference of the borehole relative to a predetermined reference point.

As will be described in further detail below, embodiments of the present disclosure may be used to adaptively encode the binned image data acquired from the LWD/MWD tool according to an optimal delta encoding scheme. The optimal delta encoding scheme may be used to minimize the size of the encoded data without sacrificing the quality of the data or image being transmitted. Additional features and advantages of the disclosed embodiments will be or will become apparent to one of ordinary skill in the art upon examination of the following figures and detailed description. It is intended that all such additional features and advantages be included within the scope of the disclosed embodiments. Further, the illustrated figures are only exemplary and are not intended to assert or imply any limitation with regard to the environment, architecture, design, or process in which different embodiments may be implemented.

FIG. 1 is a diagram of an illustrative drilling system 100 for conducting a drilling operation at a well site. As shown in FIG. 1, system 100 includes a drilling platform 102 located at the surface of a wellbore or borehole 126. Borehole 126 is drilled into different layers of a subsurface rock formation using a drill string 108 that includes a string of drill pipes connected together by "tool" joints 107. Drilling platform 102 is equipped with a derrick 104 that supports a hoist 106. Hoist 106 suspends a top drive 110 that is used to lower drill string 108 through a wellhead 112 and rotate drill string 108 within borehole 126. Connected to the lower portion of drill string 108 is a bottom hole assembly (BHA), which includes a drill bit 114, one or more downhole tools 132a and 132b (collectively referred to herein as "downhole tools 132a-b"), and a telemetry device 134. It should be appreciated that drill bit 114, downhole tools 132a-b and telemetry device 134 may be implemented, for example, as separate components within a housing of the BHA at the end of drill string 108. Although not shown in FIG. 1, it should also be appreciated that the BHA may include additional components for supporting various functions related to the drilling operations being conducted. Examples of such components include, but are not limited to, drill collars, stabilizers, reamers, and hole-openers.

Drilling of borehole 126 occurs as drill bit 114 penetrates the subsurface formation while rotating at the end of drill string 108. Drill bit 114 may be rotated in conjunction with the rotation of drill string 108 by top drive 110. Additionally or alternatively, drill bit 114 may be rotated independently from the rest of drill string 108 by a downhole motor (not shown) positioned near drill bit 114. Borehole 126 may be drilled in a vertical direction through the formation or in a non-vertical direction, e.g., at angles approaching or at horizontal. A borehole that is drilled at an angle other than vertical is generally referred to as being deviated. Drilling fluid may be pumped by a mud pump 116 through a flow line 118, a stand pipe 120, a goose neck 124, top drive 110, and down through drill string 108 at high pressures and volumes to emerge through nozzles or jets in drill bit 114. The drilling fluid emerging from drill bit 114 travels back up the borehole via a channel or annulus formed between the exterior of drill string 108 and a borehole wall 128. The drilling fluid then goes through a blowout preventer (not specifically shown) and into a mud pit 130 at the surface, where the fluid is cleaned and recirculated by mud pump 116 through drill string 108 and borehole 126. The drilling fluid may be used, for example, to cool drill bit 114, carry cuttings from the base of the bore to the surface, balance the hydrostatic pressure in the rock formations, or any of various other purposes over the course of the drilling operation.

Drilling system 100 may employ, for example, mud pulse telemetry for transmitting downhole information collected by downhole tool 132a and/or downhole tool 132b to the surface during the drilling operation. However, it should be appreciated that embodiments are not limited thereto and that any of various other types of data communication techniques may be used for sending the downhole information to the surface. Such techniques may include, for example and without limitation, wireless communication techniques and wireline or any other type of wired electrical communication techniques. Downhole tool 132a may be, for example, an MWD tool for measuring conditions downhole, including the movement, location, and orientation of the drilling assembly contemporaneously with the drilling of borehole 126. Downhole tool 132b may be, for example, an LWD tool for measuring formation parameters around a circumference of borehole 126. However, it should be appreciated that the disclosed embodiments are not limited thereto and that each of downhole tools 132a-b may be implemented using either an MWD tool or an LWD tool. Also, it should be appreciated that while distinctions between MWD and LWD may exist, the terms MWD and LWD are often used interchangeably. For purposes of this disclosure, it should be noted that the term "downhole tool" is used to refer to both the collection of formation parameters and the collection of information relating to the movement and position of the drilling assembly.

In one or more embodiments, each of downhole tools 132a-b may include a plurality of sensors for measuring formation parameters and downhole conditions for different sections of borehole 126 as it is drilled through the subsurface formation. For example, downhole tools 132a may include a sensor for measuring the azimuthal position of downhole tool 132a with respect to a fixed direction, for example, magnetic north or gravitational high side of borehole 126 (corresponding to the part of borehole 126 pointing directly up towards the surface). Such a sensor may include, for example, a system of magnetometers that sense the Earth's magnetic field and reference the relative orientation of tool 132a with respect to the magnetic field for purposes of tracking the tool's azimuthal position. For example, if the magnetometer measures cross-axial components of the Earth's magnetic field, the azimuthal position of the tool around the circumference of borehole 126 may be defined as: $\varphi m = \tan^{-1}(-By/Bx)$, where $\varphi m$ is the azimuthal position of the tool (which in this case may be referred to as the magnetic high side angle) and Bx and By are cross-axial components of the magnetic field. The cross-axial components of the magnetic field in this example may be measured in a right-handed coordinate system, where the reference for Bx is a vertical plane passing through the point of measurement and tangent to the borehole trajectory at the point of measurement.

Additionally or alternatively, the angle sensor may include, for example, an accelerometer that senses the Earth's gravitational pull and references the relative orientation of tool 132a with respect to the gravitational high side in order to track the orientation of tool 132a within the formation. As with the magnetic high side angle, the gravitational high side angle around the circumference of borehole 126 may be defined as: $\varphi g = \tan^{-1}(-gy/gx)$, where $\varphi g$ is the azimuthal position of the tool (which in this case may be referred to as the gravitational high side angle) and gx and gy are cross-axial components of the gravitational field. The cross-axial components of the gravitational field in this example may be measured in a right-handed coordinate system, where the reference for gx is a vertical plane passing through the point of measurement and tangent to the borehole trajectory at the point of measurement. However, it should be appreciated that embodiments of the present disclosure are not limited thereto and that any of various other conventions may be used for azimuthal reference angles. For purposes of discussion and ease of explanation, the sensor for measuring azimuthal angles with respect to a reference azimuthal angle will be referred to herein as an "angle sensor," although many other angles can be measured with an MWD or LWD tool (e.g., the inclination or the azimuth of the borehole with respect to magnetic North, which is the angle between the projection of the borehole axis on a horizontal surface and the horizontal component of the earth's magnetic field.) In some implementations, the angle sensor may incorporate magnetometers, accelerometers, and/or other types of angle sensors.

As will be described in further detail below, the data collected by downhole tool 132a and/or 132b may include measurements of formation properties around a circumference of the borehole at a current depth of downhole tool 132a and/or 132b. In one or more embodiments, the collected data may be transferred from downhole tools 132a-b to telemetry device 134 for compressing or encoding the data before it is transmitted to the surface. By compressing the data prior to its transmission, it may be possible to reduce the overall number of bits of information that need to be sent to the surface relative to the same amount of uncompressed data, thus increasing effective data transmission rate. In one or more embodiments, telemetry device 134 may adaptively encode the data using an optimal delta encoding scheme for reducing the size of the data without sacrificing the quality of the data or resolution of the borehole image being transmitted. As will be described in further detail below, the optimal delta encoding scheme may be selected from a plurality of available delta encoding schemes based on the particular data being encoded or particular characteristics of the formation in which the data was collected.

Telemetry device 134 may transmit the encoded data to the surface by, for example, modulating the flow of drilling fluid through drill string 108 so as to generate pressure pulses that propagate to the surface. The pressure pulses may be received at the surface by various transducers 136, 138 and 140, which convert the received pulses into electrical signals for a signal digitizer 142 (e.g., an analog to digital converter). While three transducers 136, 138 and 140 are shown in FIG. 1, a greater or fewer number of transducers may be used as desired for a particular implementation. Digitizer 142 supplies a digital form of the pressure signals to a data processing device or computer 144. Computer 144 may be implemented using any type of computing device having at least one processor and a memory. Computer 144 may process and decode the digital signals received from digitizer 142 using an appropriate decoding scheme. For example, the digital signals may be in the form of a bit stream including reserved bits that indicate the particular encoding scheme that was used to encode the data downhole. Computer 144 can use the reserved bits to identify the corresponding decoding scheme to appropriately decode the data. The resulting decoded telemetry data may be further analyzed and processed by computer 144 to display useful information to a well site operator. For example, a driller could employ computer system 144 to obtain and monitor the position and orientation of the BHA (or one or more of its components), other drilling parameters, and/or one or more formation properties of interest over the course of the drilling operation.

The pressure pulses transmitted by telemetry device 134 in the above example may be, for example, traveling pressure signals that are representative of measured downhole parameters. In an ideal system, each and every pressure pulse created downhole would propagate upstream and be easily detected by a transducer at the surface. However, drilling fluid pressure generally tends to fluctuate significantly and contain noise from several sources (e.g., bit noise, torque noise, and mud pump noise). Bit noise may be caused by, for example, the vibration of drill bit 114 during the drilling operation. As the bit moves and vibrates, the drilling fluid exit ports in the bit can be partially or momentarily restricted, creating a high frequency noise in the pressure signal. Also, torque noise may be generated downhole if drill string 108 starts to torque up as a result of drill bit 114 getting stuck within a formation. The subsequent release of drill bit 114 would relieve the torque on drill string 108 and generate a low frequency, high amplitude pressure surge. Furthermore, mud pump 116 may create cyclic noise as the pistons within the pump force the drilling fluid into the drill string.

Accordingly, drilling system 100 may include a dampener or desurger 152 to reduce noise. Flow line 118 couples to a drilling fluid chamber 154 in desurger 152. A diaphragm or separation membrane 156 separates the drilling fluid chamber 154 from a gas chamber 158. Desurger may include a gas chamber 158 filled with nitrogen at a predetermined percentage, e.g., approximately 50% to 75% of the operating pressure of the drilling fluid. The diaphragm 156 moves with variations in the drilling fluid pressure, enabling the gas chamber to expand and contract, thereby absorbing some of the pressure fluctuations. While the desurger 152 absorbs some pressure fluctuations, the desurger 152 and/or mud pump 116 also act as reflective devices. That is, pressure pulses propagating from the telemetry device 134 tend to reflect off the desurger 152 and/or mud pump 116, sometimes a negative reflection, and propagate back downhole. The reflections create interference that, in some cases, adversely affects the ability to determine the presence of the pressure pulses propagating from the telemetry device 134.

Figure 2:
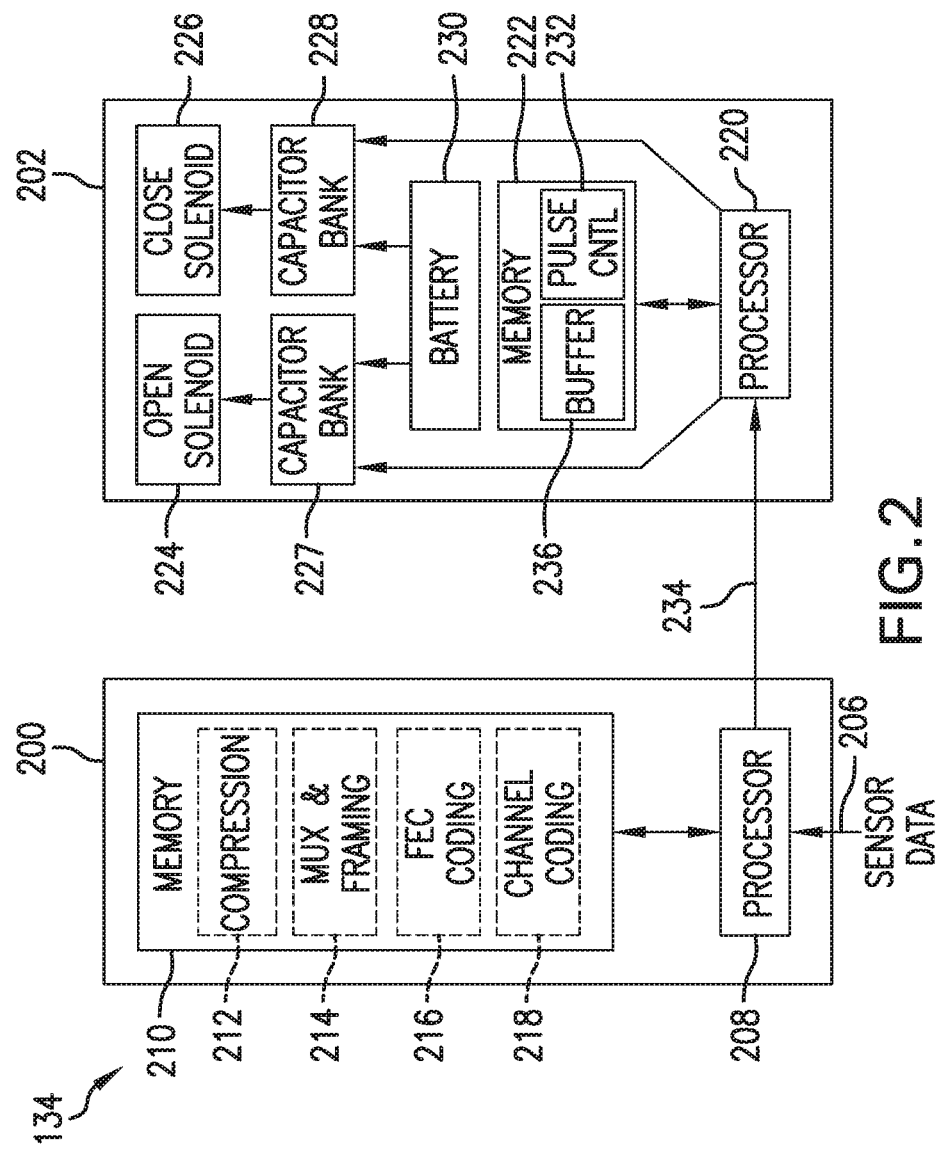
FIG. 2 is a block diagram of an illustrative telemetry device for the downhole drilling assembly of FIG. 1.

FIG. 2 is a block diagram of an illustrative configuration of telemetry device 134 for drilling system 100 of FIG. 1, as described above. As shown in FIG. 2, telemetry device 134 in this example includes a data encoder 200 and a pulse modulator 202. In some implementations, data encoder 200 and pulse modulator 202 may be different components of a single physical device, e.g., different chips on a circuit board within telemetry device 134. Alternatively, data encoder 200 and pulse modulator 202 may be implemented as separate physical devices, e.g., separate circuit boards that are communicatively coupled together via an electrical or wired connection.

Data encoder 200 includes a processor 208 (e.g., a digital signal processor (DSP)) and a memory 210 for processing sensor data 206 received from one or more downhole tools (e.g., downhole tools 132a-b of FIG. 1, as described above). The processor 208 operates in accordance with software from memory 210 to represent the sensor data 206 in the form of a digital transmit signal. In particular, the software contained in memory 210 comprises multiple software modules 212-218. Compression module 212 processes the incoming sensor data to reduce the amount of transmitted data, such as by various compression techniques, by eliminating particular data points or by taking representative samples. In some cases, the data stream may be differentially encoded, so that differences between successive values are sent rather than the values themselves. Usually, differential encoding permits a data stream to be represented with fewer bits. Other compression techniques may be equivalently used. Multiplexing and framing module 214 selects sensor data from the various downhole tools to construct a single transmit data stream. The transmit data stream is divided into data blocks that may be accompanied by framing information in some embodiments. The framing information may include synchronization information and/or error correction information from forward error correction (FEC) module 216. Channel coding module 218 converts the digital transmit signal into a set of timings. The precise nature of the set of timings depends on the particular pulse encoding system, examples of which are discussed more below. The processor 208 then communicates the timings to the pulse modulator 202.

The pulse modulator 202 induces pressures pulses in the drilling fluid within the drill string 108 based on the set of timings received from the data encoder 200. The pulse modulator 202 includes a processor 220, a memory 222, an open solenoid 224, a close solenoid 226, capacitor banks 227 and 228, and a battery 230. The processor 220 operates in accordance with software from memory 222, in particular a pulse controller or control module 232, to control creating pulses in the drilling fluid. The processor 220 accepts the set of timings from processor 208 of the data encoder 200 across communication pathway 234. The communication pathway 234 may be either a serial or parallel communication pathway. The pulse controller 232 may, in bursts, receive sets of timings from the data encoder 200 faster than sets of timings can be implemented. Thus, memory 222 further comprises a buffer 236 in which the processor 220 may place multiple sets of timings, the buffer 234 thereby acting as a queue.

The pulse modulator 202 creates pressure pulses in the drilling fluid by control of a valve. In the embodiments illustrated the valve (not specifically shown) is opened by operation of the open solenoid 224, and the valve is closed by operation of the close solenoid 226. Solenoids use relatively high amounts of current to operate, in some cases more instantaneous current than battery 230 can provide. However, the power (voltage times current) used to operate a solenoid is well within the capabilities of battery. To address the current versus power issue, in accordance with at least some embodiments each solenoid 224 and 226 is associated with a capacitor bank 227 and 228, respectively. The battery 230 charges each capacitor bank between uses at a charge rate within the current capability of the battery 230. When the processor 220 commands the valve to open, capacitor bank 227 is electrically coupled to the open solenoid 224, supplying electrical current at sufficiently high rates to operate the solenoid (and open the valve). Likewise, when the processor 220 commands the valve to close, capacitor bank 228 is electrically coupled to the close solenoid 226, supplying electrical current at sufficiently high rates to operate the solenoid (and close the valve).

While the components of data encoder 200 in the above example, including compression module 212, multiplexing and framing module 214, FEC module 216 and channel coding module 218, are described as software modules, it should be appreciated that data encoder 200 is not intended to be limited thereto and that the above-described components of data encoder 200 may be implemented in hardware alone or any combination of software, firmware, and hardware. Similarly, while pulse controller 232 is described as a software module of pulse modulator 202 in the above example, it should be appreciated that pulse modulator 202 is not intended to be limited thereto and that the pulse controller 232 of pulse modulator 202 may be implemented in hardware alone or any combination of software, firmware, and hardware.

In the above example, the valve that physically creates the pressure pulses in the drilling fluid may take many forms. In some cases, the valve may create pressure pulses by temporarily restricting or even blocking flow of the drilling fluid in the drill string. In situations where the drilling fluid is restricted or blocked, an increase in drilling fluid pressure is created (i.e., a positive-pulse system). In other cases, the valve may be configured to divert a portion of the drilling fluid out of the drill string into the annulus 126, thus bypassing the drill bit 114. In situations where the drilling fluid is diverted, a decrease in drilling fluid pressure occurs (i.e., a negative-pulse system). Either positive-pulse systems or negative-pulse systems may be used in the various embodiments, so long as the telemetry device 134 can create pressure transitions (lower drilling fluid pressure to higher drilling fluid pressure, and vice versa) with sufficient quickness (e.g., 18 milliseconds (ms)).

Figure 3:
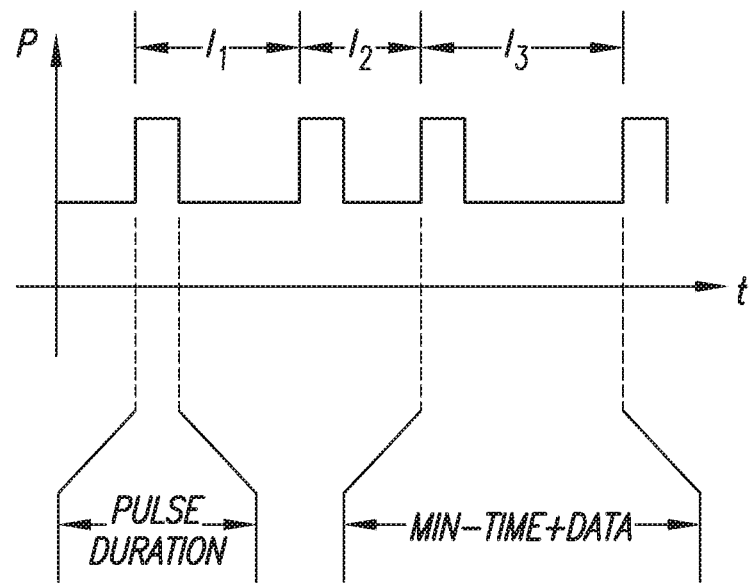
FIG. 3 is an illustrative graph of drilling fluid pressure as a function of time with multiple intervals between pressure pulses.

FIG. 3 shows an exemplary graph of downhole drilling fluid pressure as a function of time. The drilling fluid pressure may be measured at the surface by the computer system 144 coupled to one of the transducers 136, 138 and/or 140 of drilling system 100 of FIG. 1, as described above. The illustrative graph of FIG. 3 represents an ideal situation where ideal square wave pulses are generated downhole, and are detected as ideal square waves at the surface. FIG. 3 shows the pulses as positive pulses for convenience, but embodiments are not limited thereto and negative pulses may be used instead. The duration of each pulse may be within a certain range of time, e.g., from 80 milliseconds (ms) to 400 ms, depending on the various parameters of the particular drilling system. In pure pulse position modulations systems, the pulse durations are substantially constant to aid in detection. However, in some embodiments, a variety of pulse durations may be selectively used (e.g., 50 ms pulses, 100 ms pulses, 150 ms pulses, and 200 ms pulses).

The downhole data in this example may be transmitted in intervals. FIG. 3 shows three such intervals I1, I2 and I3. In embodiments utilizing pulse position modulation, an interval may be the amount of time between coherent features of two consecutive pressure pulses. For example, as shown in FIG. 3, an interval may be an amount of time between leading pressure transitions of each pulse. Alternatively, an interval may be the amount of time between trailing pressure transitions of each pulse, or the amount of time between the centers of each pulse. Each interval has a duration that is at least a minimum time (MIN-TIME). An interval having duration substantially equal to the MIN-TIME encodes a data value zero. The MIN-TIME duration may allow the drilling fluid column to settle after a pressure transition event (allows ringing and other noise in the drilling fluid to dampen out). The MIN-TIME may change for each particular drilling situation, but in most cases ranges from between approximately 0.3 seconds to 2.0 seconds. In some embodiments (e.g., positive-pulse systems), a MIN-TIME of 0.6 seconds may be used. In other embodiments (e.g., negative-pulse systems) a MIN-TIME of 1.0 seconds may be used.

Figure 4:
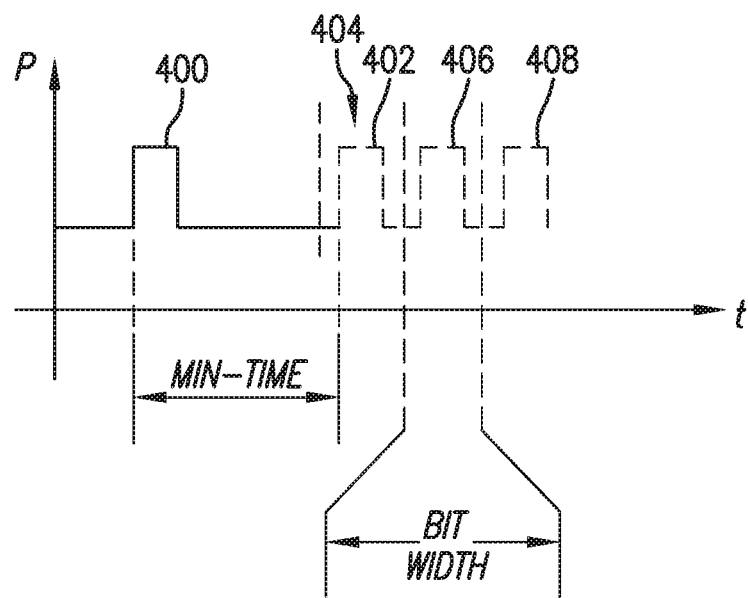
FIG. 4 is another illustrative graph of drilling fluid pressure as a function of time, in which a single interval of a first pulse is followed by several possible second pulses.

FIG. 4 shows a single interval comprising a first pulse 400 and several possible second pulses (shown in dashed lines) to further illustrate parameters. For purposes of pulse position modulation, embodiments may utilize a window in which a pulse of an interval may fall and yet still represent the same value. After the MIN-TIME, a pulse may fall within one of several BIT-WIDTH windows. So long as the pulse falls somewhere within one of the BIT-WIDTH windows, the data value encoded is still the same. For example, the pulse 402 falls within a first BIT-WIDTH window 404, and thus in this particular example the interval encodes a data value zero (e.g., hexadecimal 00). Pulse 406 falls within the next BIT-WIDTH window, and therefore the time duration between pulse 400 and pulse 406 represents a first data value (e.g., hexadecimal 01). Likewise, the pulse 408 falls within the third BIT-WIDTH window, and therefore the time duration between pulse 400 and pulse 408 may represent a second data value (e.g., hexadecimal 10). The data value may be decoded using, for example, Equation (1) as follows:

$$\text{DATA} = (\text{INTERVAL} - \text{MIN-TIME})/\text{BIT-WIDTH} \tag{1},$$

where DATA is the decoded value, INTERVAL is the measured time between coherent features of the two pulses, and MIN-TIME and BIT-WIDTH are as described above. It should be noted that in the ideal case, DATA is an integer. However, in the presence of noise, Equation (1) is likely to produce a non-integer value. Accordingly, the value produced by Equation (1) may be rounded (e.g., rounded up or down) to the nearest integer. In some embodiments, a floor function for truncation or a ceiling function for rounding up may also be used, with different results in terms of error of the transmitted data value. The BIT-WIDTH may change for each particular drilling situation, but in most cases ranges from between approximately 20 ms to 120 ms, and in many cases a BIT-WIDTH of 40 ms is used. For a particular number of bits encoded within each interval, there is a maximum time (MAX-TIME) duration. For example, if a particular interval encodes a four-bit number (which could therefore range from zero to fifteen), the four-bit number at its maximum value forces an interval duration equal to MAX-TIME.

The downhole data transmitted to the surface using the mud pulse telemetry techniques described above may include encoded image data based on measurements of formation properties collected by one or more downhole tools, e.g., downhole tools 132a and/or 132b of FIG. 1, as described above. Also, as described above, the measurements may be collected by the downhole tool(s) for a section of a borehole (e.g., borehole 126 of FIG. 1) at a current depth of the downhole tool(s) within the borehole. For example, the formation property measurements may be collected by the downhole tool(s) around the circumference of the borehole, as shown in the example of FIG. 5.

Figure 5:
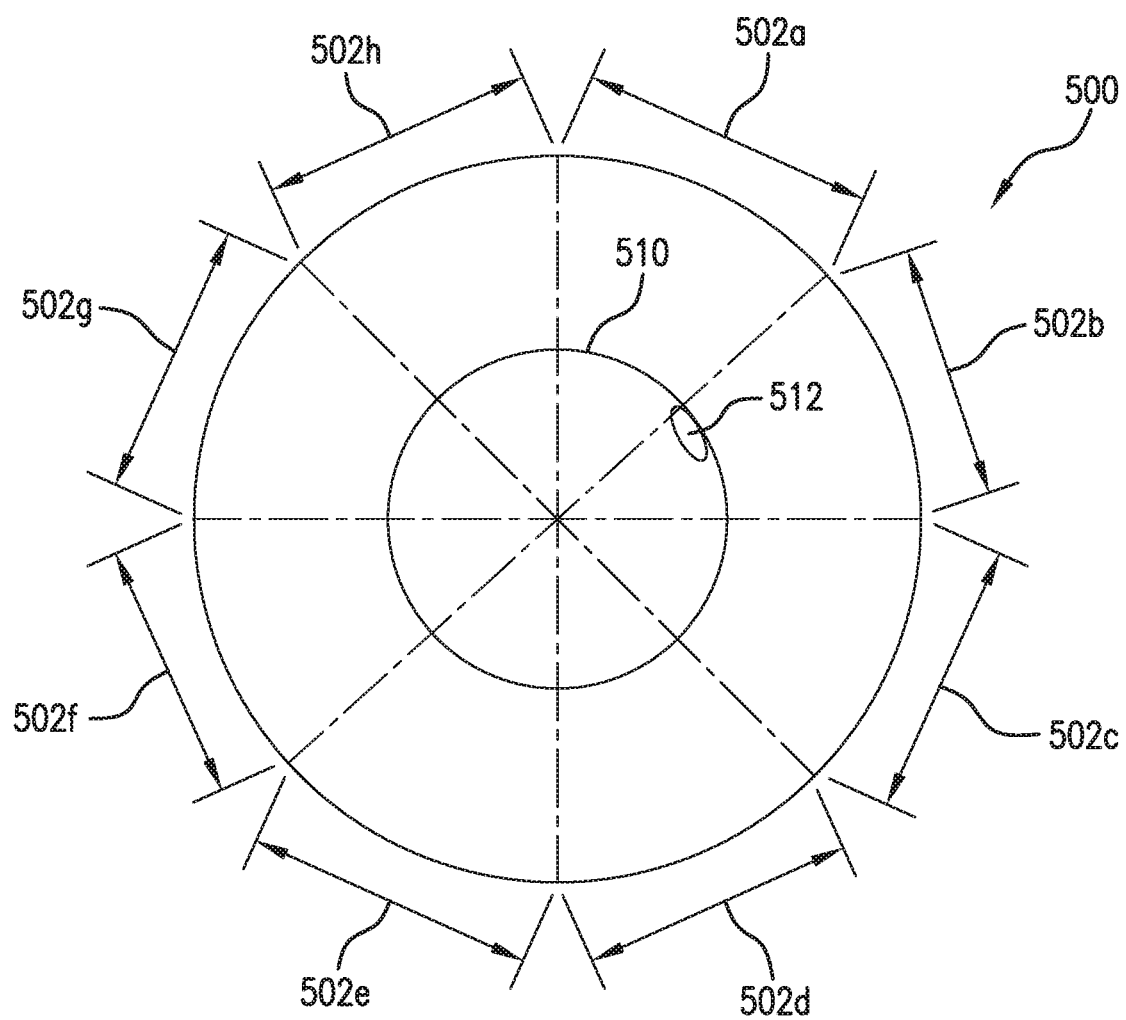
FIG. 5 is a cross-sectional view of an illustrative borehole in which a downhole tool rotates and collects measurements at its current depth within the borehole.

FIG. 5 is a cross-sectional view of an illustrative borehole 500 in which a downhole tool 510 rotates and collects measurements around a circumference of the borehole. As shown in FIG. 5, downhole tool 510 may include a sensor 512 for measuring one or more formation properties as tool 510 rotates in a clockwise or counterclockwise direction within the borehole. Downhole tool 510 may be implemented using, for example, downhole tool 132a or 132b of FIG. 1, as described above. While only sensor 512 is shown in FIG. 5, it should be appreciated that embodiments are not limited thereto and that downhole tool 512 may include any number of sensors as desired for a particular implementation.

In one or more embodiments, downhole tool 510 may also include additional sensors (not shown) for measuring various drilling parameters and/or conditions of borehole 500. In one example, downhole tool 510 may further include a sensor for tracking the tool's azimuthal position as it rotates around the circumference of borehole 500. As described above, the angle sensor may include, for example, one or more magnetometers or accelerometers for measuring the orientation of tool 510 relative to the Earth's magnetic field and/or gravitational field, respectively.

As will be described in further detail below, the measurements collected by downhole tool 510 may be transformed into a representation of the measured formation properties as measured around the circumference of the borehole. The data can be represented as, for example, an image log of one or more representative formation characteristics at different points around the circumference of borehole 500. An image of borehole 500 may therefore represent a set of measurements around a section of borehole 500 at the same measured depth, e.g., a current depth of tool 510. Such image data may be collected by tool 510 as, for example, a set of measured pairs including a formation property measurement and a corresponding angle or azimuthal position of tool 510 around the circumference of borehole 500 when the measurement was collected. The azimuthal position of tool 510 may correspond to, for example, the azimuthal position of the particular sensor, e.g., sensor 512, used to obtain the formation property measurement.

In one or more embodiments, the formation property measurements collected by tool 510 as it rotates within borehole 500 may be binned into a plurality of azimuthal bins 502a-502h based on the corresponding azimuthal position of tool 510 (and/or sensor 512). As shown in FIG. 5, azimuthal bins 502a-502h may correspond to different angular sectors around the circumference of borehole 500, where the sectors may be of equal subtended angle based on the number of sectors or corresponding bins used. For example, as eight bins are used in FIG. 5, each of bins 502a-502h may correspond to an angular sector of 45 degrees around borehole 500. Although eight bins 502a-502h are shown in the example of FIG. 5, it should be noted that embodiments are not intended to be limited thereto and that any number of bins may be used. For example, the number of bins may be four or any higher even number, e.g., 6, 8, 10, 12, 14, 16, etc., as desired for a particular implementation.

In one or more embodiments, the binned image data described above may be transformed into a compressed binary representation using a delta encoding compression technique prior to transmission to the surface. Such a compression technique may include encoding a binned image based on a set of delta values computed for the image data bins. Each computed delta value may represent a difference between a previously transmitted data value in a preceding bin and the data value of the current bin. Each bin may include, for example, values of one or more downhole formation parameters. Examples of such parameters may include, but are not limited to, an uncompressed electromagnetic wave resistivity (an eight-bit value encoded in two intervals), an uncompressed gamma ray reading (an eight-bit value encoded in two intervals), and an uncompressed density value (a twelve bit value encoded in three intervals). Using the resistivity parameter as an example, if the value of this parameter in a current bin has not changed from the value that was previously transmitted to the surface from a preceding bin, a delta value of zero may be sent (rather than encoding again the entire eight bit value). Likewise, if the resistivity parameter experiences any change in value from the value previously sent, a number representing the change in value may be transmitted to the surface.

As only the change in value, or "delta" value, is sent to the surface, the overall number of bits to transfer the information is reduced, thereby increasing the effective data transfer rate to the surface. The delta values may be encoded by quantizing the deltas and using a reduced number of bits. The method used at present transmits the image using a delta sequence of either 3 bits, 2 bits, or 1 bits. As will be described in further detail below, embodiments of the present disclosure may be used to further reduce the size of the delta encoded image by adaptively encoding the binned image according to an optimal delta encoding scheme selected for the particular image data.

Figure 6:
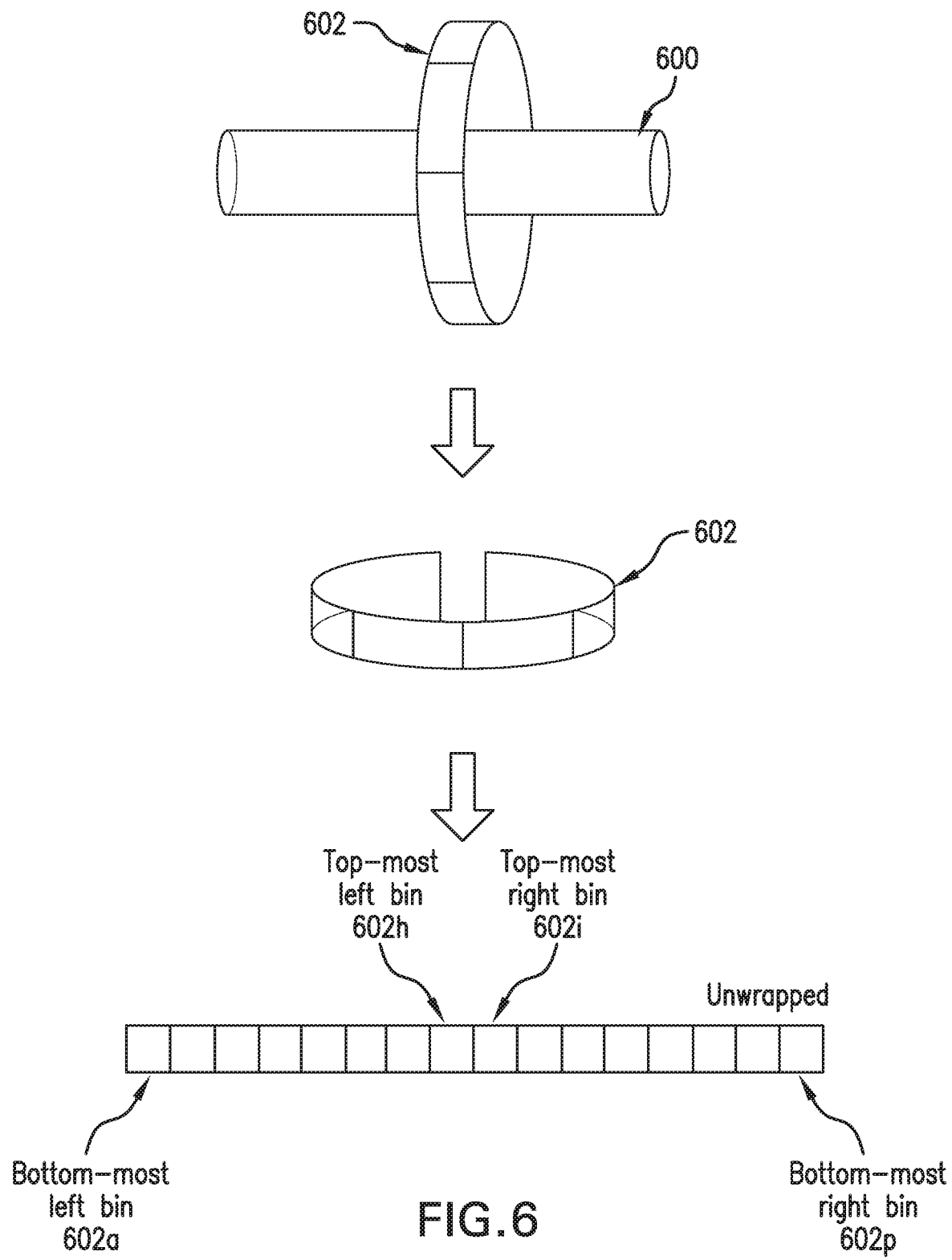
FIG. 6 is a diagram of an illustrative process for "unwrapping" a borehole image into a plurality of azimuthal bins for which delta values may be calculated.

FIG. 6 is a diagram illustrating how a borehole image may be "unwrapped" into a plurality of bins from which a set of delta values is computed for delta encoding the image. The borehole image may constitute, for example, a set of formation property measurements collected by a downhole tool, e.g., tool 510 of FIG. 5, as described above, as it rotates around a section 602 of a borehole 600, as shown in FIG. 6. In contrast with FIG. 5, the measurements collected by the downhole tool in this example may be binned into a plurality of sixteen azimuthal bins 602a-602p. However, it should be appreciated that any number of bins may be used as desired for a particular implementation. It should also be appreciated that, while the examples in FIGS. 5 and 6 show an even number of azimuthal bins, the disclosed delta encoding techniques are not intended to be limited thereto and that these techniques may be applied using an odd number of azimuthal bins.

In one or more embodiments, the bins may be encoded in a sequential order beginning at a first bin corresponding to a reference point selected for the image relative to the face of the downhole tool and then, processing subsequent bins in a predetermined direction (e.g., clockwise) around the borehole. If the downhole tool is positioned within a horizontal or deviated portion of the borehole, the reference point may correspond to, for example, the bottom-most portion of the borehole image when viewed relative to the gravitational tool face downhole. However, if the downhole tool is within a vertical or near-vertical portion of the borehole, a reference point that is different from the bottom of the borehole should be used. In such cases, the reference point of the image may correspond to, for example, the magnetic tool face of the downhole tool. For example, the delta values for the 16 azimuthal bins in this example may be calculated as follows:

Bin 1 (uncompressed);

Delta Bin 2=Bin 2−Bin 1;

Delta Bin 3=Bin 3−Bin 2;

Delta Bin 4=Bin 4−Bin 3;

Delta Bin 5=Bin 5−Bin 4;

...

Delta Bin 16=Bin 16−Bin 15;

where Bins 1-16 correspond to bins 602a-602p of the unwrapped borehole image shown in FIG. 6. In this example, bin 602a of the unwrapped borehole image may correspond to the bottom-most left portion of the borehole image. Also, as shown in FIG. 6, bin 602h may correspond to the top-most left portion of the unwrapped image, bin 602i may correspond to the top-most right portion of the image, and bin 602p may correspond to the bottom-most right portion.

As bin 602a is the first bin in the sequence of bins of the borehole image, the corresponding image data may be transmitted as uncompressed data without any delta values calculated for the bin. For each of the remaining bins 602b-602p, delta values may be calculated for one or more parameter values based on the corresponding values of the immediately preceding bin in the sequence of bins. For example, the delta value calculations for each of these remaining bins may be expressed by Equation (2) as follows:

$$\Delta A[n]=A[n]-A[n-1] \qquad (2),$$

where A represents a downhole parameter of interest, ΔA is the change in value of parameter A, n is the index to the current datum, and n−1 is the index to the last datum transmitted.

Figure 7:
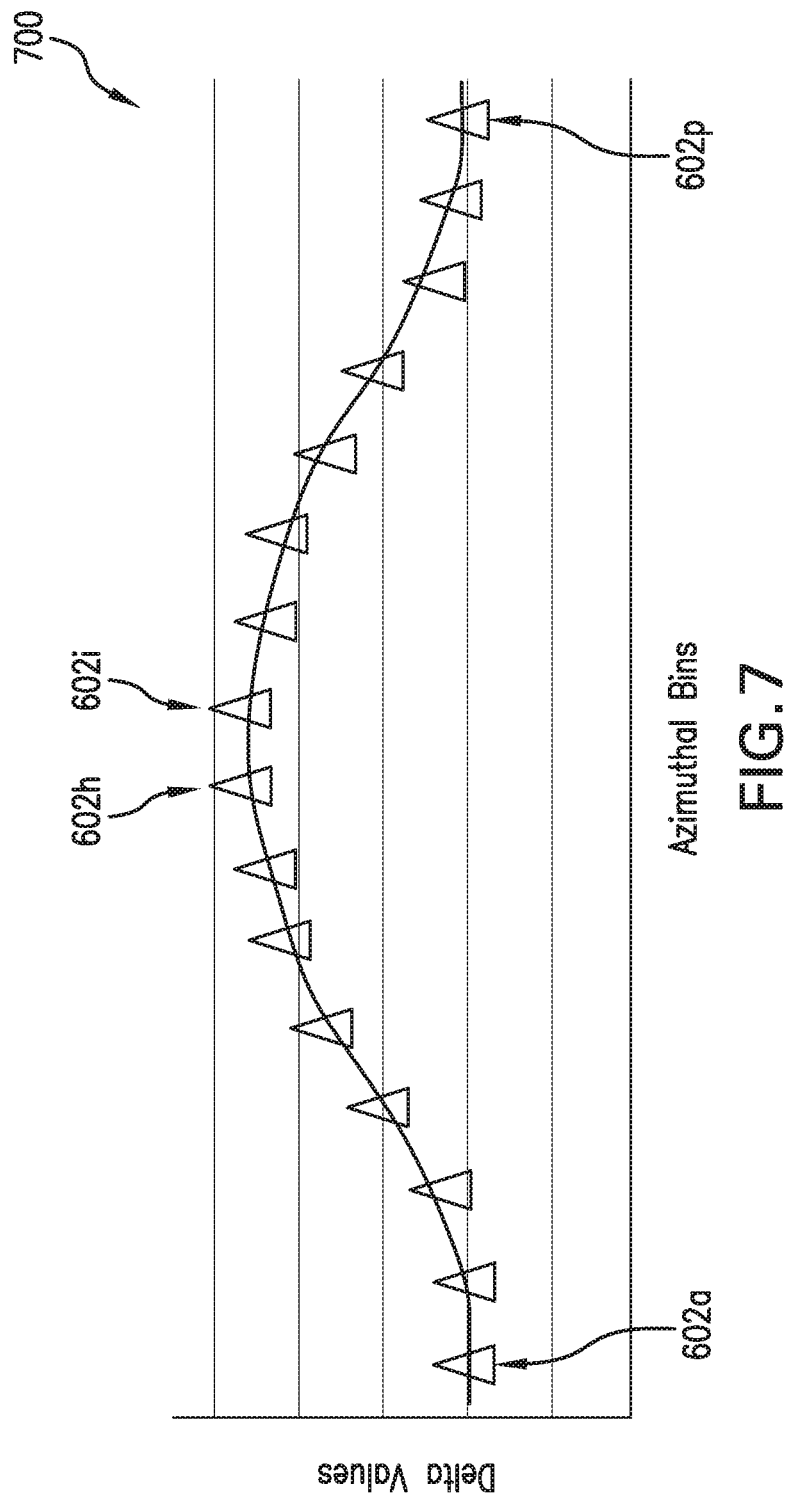
FIG. 7 is an illustrative plot of the measurements/image data collected by the downhole tool relative to an azimuth of the tool within the borehole.

FIG. 7 is a data plot 700 illustrating the delta values of azimuthal bins 602a-602p of FIG. 6 relative to the location of each azimuthal bin with respect to the borehole image, as described above. In particular, data plot 700 shows that the change in delta values between adjacent azimuthal bins is relatively small. Also, the values obtained for the image tend to vary in a trend manner from top-most bin to the bottom-most bin, with the values either trending positive or negative from top to bottom (e.g., from bin 602h to bin 602a or from bin 602i to bin 602p).

In one or more embodiments, such trends may be taken into account for purposes of adaptively encoding the borehole image data by selecting an optimal delta encoding scheme based on the trend characteristics of the data being encoded. The trend characteristics of the data may depend on the particular characteristics of the formation in which the data was collected. For example, the variation trend in data values from top to bottom of the borehole image as depicted in data plot 700 may be indicative of formation property measurements collected by the downhole tool while crossing a horizontal formation boundary as the borehole is drilled at an angle or non-vertical direction within the formation. In this example, the image data collected for a portion of borehole circumference may be representative of one formation layer while the data collected for the remainder of the circumference is representative of a different formation layer.

In another example, the borehole may be drilled in a horizontal, vertical or other direction through a horizontal layer of the formation with generally homogenous formation characteristics. In this case, there may be very little variation in the measured formation properties at different points around the circumference of the borehole.

In either of the above examples, the disclosed embodiments may be used to select an optimal delta encoding scheme that accounts for the particular characteristics of the formation as represented by the data being encoded. The optimal delta encoding scheme may be selected from a plurality of available delta encoding schemes, as shown by the examples in FIGS. 8A, 8B, and 8C.

Figure 8B:
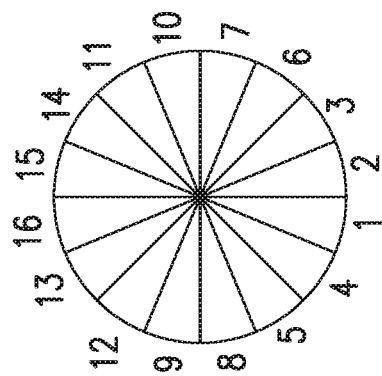
FIGS. 8A, 8B and 8C are diagrams of various delta encoding patterns for generating a delta-encoded binned representation of the measurements collected by the downhole tool for a section of the borehole.
Figure 8C:
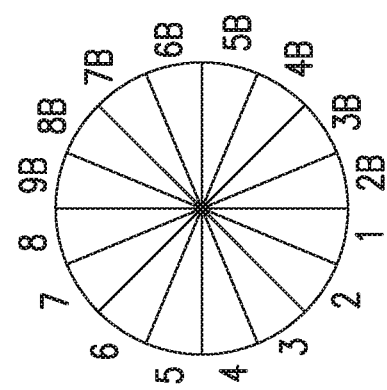
Figure 8A:
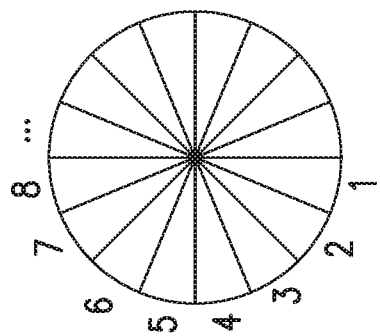

FIGS. 8A, 8B and 8C are diagrams of various delta encoding schemes for generating a delta-encoded binned representation of the measurements collected by the downhole tool for a section of the borehole. Each of these delta encoding schemes may correspond to a different pattern or sequence in which the delta values may be calculated for the plurality of azimuthal bins around the circumference of the borehole, as described above.

The delta encoding scheme or pattern shown in FIG. 8A is similar to the encoding scheme described above with respect to FIG. 6, in which the delta values are calculated for the plurality of bins in a sequence starting from the bottom-most left bin (1) and continuing in a clockwise direction around the borehole image to the bottom-most right bin.

The delta encoding scheme of FIG. 8B may be used to calculate the delta values for the bins in a single sequence that daisy-chains from the bottom-most bin (1) to the top-most bin (16). For example, referring back to the data shown in plot 700 of FIG. 7, as described above, if the full datum for Bin 1 is sent followed by Delta Bin 2, Delta Bin 3, Delta Bin 4, and so on, the data sequence would be as follows: 0, <0, 0, <0, 0, etc. If such symmetry exists, it may be possible to greatly reduce the number of bits transmitted to the surface by, for example, transmitting three bits to identify the pattern and then transmitting the first datum without compression, followed by the unsigned value of the third datum and each datum thereafter. However, it should be appreciated that such symmetry may be unlikely in real-word applications and the data collected downhole generally may not have the symmetry of the data presented in this example.

The delta encoding scheme of FIG. 8C may be used to calculate the delta values in two sequences—a first sequence from the bottom-most left bin (1) to the top-most left bin (8) and a second sequence from the bottom-most right bin (2B) to the top-most right bin (9B). The delta encoding scheme of FIG. 8C may be the most optimal scheme for encoding borehole image measurements collected for a non-vertical section of the borehole. As described above with respect to data plot 700 of FIG. 7, the delta values calculated for such image data are known to vary in a trend manner relative to the circumference of the borehole, e.g., from the top-most left azimuthal bin to the bottom-most left bin or vice versa. For example, such a data trend may allow the two sequences of delta values calculated using this delta encoding scheme to have the same sign. Accordingly, at least one of the sign bits for the two delta value sequences may be eliminated from the delta encoded binary representation of the image data.

In one or more embodiments, at least one of the delta encoding schemes of FIGS. 8A-8C, as described above, may be selected based on the symmetry of the borehole image data. For a borehole image consisting of N data samples ($S_1$, $S_2$ . . . $S_N$) acquired by a downhole tool in a clockwise direction about the borehole, the delta encoding scheme for transmitting the data to the surface may be expressed as follows:

$$|S_{I-1+j}-S_{N+I-j}|=\Delta_{I,j}, j=1, \ldots N/2 \text{ (where } N \text{ is even)};$$
and $$|S_{I-1+j}-S_{N+I-j}|=\Delta_{I,j}, j=1, \ldots (N-1)/2, I=1, \ldots (N-1)$$
$N/2$ (where $N$ is odd).

However, it should be appreciated that embodiments of the present disclosure are not limited thereto and that the data may be acquired or sampled in any specified order as desired for a particular implementation.

For a given expression "$S_k$" representing the data in this example, k may be interpreted cyclically, i.e., if a value of k computes to N+1, $S_1$ may be used; however, if a value of k computes to zero or a negative value, the value of N may be added to k.

For a set of data samples from a starting index I to an ending index j, where the sum of the deltas from I to j is determined to be less than a maximum allowable value (i.e., $\Sigma_j \Delta_{I,j} < \Delta \max$), the full value of the first data sample ($S_I$) may be transmitted first, and the remaining data samples may be treated as though they are symmetric.

If the value of N is even, the remaining data samples may be transmitted using the following sequence:

$$S_{I+1}-S_I, S_{I+2}-S_{I+1}, \ldots S_{I+\frac{N}{2}}-S_{I-1+\frac{N}{2}}, \text{ then}$$

$$S_{N+I-1}-S_I, S_{N+I-2}-S_{I-1}, \ldots, S_{\frac{N}{2}+I+1}-S_{\frac{N}{2}+I+2}.$$

In one or more embodiments, additional sequences may be calculated as alternatives to the above sequence, and the sequence having the least sign reversals may be selected for transmission to the surface. For example, two alternate sequences may be defined as follows:

Alternate sequence 1:

$$S_{I+1} - S_I, S_{I+2} - S_{I+1}, \ldots S_{I-1+\frac{N}{2}} - S_{I-2+\frac{N}{2}}, \text{ then}$$

$$S_{N+I-1} - S_I, S_{N+I-2} - S_{I-1}, \ldots, S_{\frac{N}{2}+I+2} - S_{\frac{N}{2}+I+3};$$

Alternate sequence 2:

$$S_{I+1} - S_I, S_{I+2} - S_{I+1}, \ldots S_{I+1+\frac{N}{2}} - S_{I+\frac{N}{2}}, \text{ then}$$

$$S_{N+I-1} - S_I, S_{N+I-2} - S_{I-1}, \ldots, S_{\frac{N}{2}+I-1} - S_{\frac{N}{2}+1}.$$

For sufficiently small values of N, there may be repetitions in the series of data samples for either of the above sequences as the second portion of each series is filled according to the prescribed sequence. To avoid using such repetitious values, another way of defining the sequences may be as shown below for a default sequence and the two alternate sequences:

Default Sequence:

$$S_I, S_{I+1} - S_I, S_{I+2} - S_{I+1}, \ldots S_{I+\frac{N}{2}} - S_{I-1+\frac{N}{2}}, \text{ then}$$

$$S_{N+I-1} - S_I, S_{N+I-2} - S_{I-1}, \ldots \text{ until there are } N \text{ terms in the sequence;}$$

Alternate sequence 1:

$$S_I, S_{I+1} - S_I, S_{I+2} - S_{I+1}, \ldots S_{I-1+\frac{N}{2}} - S_{I-2+\frac{N}{2}}, \text{ then}$$

$$S_{N+I-1} - S_I, S_{N+I-2} - S_{I-1}, \ldots, \text{ until there are } N \text{ terms in the sequence;}$$

Alternate sequence 2:

$$S_{I+1} - S_I, S_{I+2} - S_{I+1}, \ldots S_{I+1+\frac{N}{2}} - S_{I+\frac{N}{2}}, \text{ then}$$

$$S_{N+I-1} - S_I, S_{N+I-2} - S_{I-1}, \ldots, \text{ until there are } N \text{ terms in the sequence.}$$

If the value of N is odd, the remaining data samples may be transmitted using the following sequence:

$$S_{I+1} - S_I, S_{I+2} - S_{I+1}, \ldots, S_{I+\frac{(N-1)}{2}} - S_{I+\frac{(N-1)}{2}-1}, S_{I-1} - S_I,$$

$$S_{I-2} - S_{I-1}, \ldots, S_{I-\frac{(N-1)}{2}+1} - S_{I-\frac{(N-1)}{2}+2}$$

Thus, for example, if N=8 and I=3, the transmission sequence for the data samples may be either of the two sequences shown in Table 1 below, where the transmission sequence in either of the last two columns may be used as a possible alternative to the default transmission sequence in the second column.

TABLE 1

Delta Encoding Sequences for N = 8 and I = 3

| Bin | Default Sequence | Alternate Sequence 1 | Alternate Sequence 2 |
|---|---|---|---|
| 1 | S3 | S3 | S3 |
| 2 | S4-S3 | S4-S3 | S4-S3 |
| 3 | S5-S4 | S5-S4 | S5-S4 |
| 4 | S6-S5 | S6-S5 | S6-S5 |
| 5 | S7-S6 | S2-S3 | S7-S6 |
| 6 | S2-S3 | S1-S2 | S8-S7 |
| 7 | S1-S2 | S8-S1 | S2-S3 |
| 8 | S8-S1 | S7-S8 | S1-S2 |

The Bin numbers in Table 1 above may represent the corresponding azimuthal bins for the delta encoded data in this example.

Another approach that may be used builds on the symmetry of the data by averaging symmetric pairs and transmitting an average starting value along with differences of sequential averages thereafter. Using the example above, the encoded data may be transmitted as shown in Table 2 below.

TABLE 2

Delta Encoding Sequence for Symmetrical Data

| Bin | Sequence |
|---|---|
| 1 | (S3 + S2)/2 |
| 2 | (S4 + S1)/2 − (S3 + S2)/2 |
| 3 | (S5 + S8)/2 − (S4 + S1)/2 |
| 4 | (S6 + S7)/2 − (S5 + S8)/2 |

In yet another approach, the borehole image to be transmitted as a signal may be fitted to a sine wave with an amplitude and phase offset. The phase offset may then be used to identify the point of symmetry. That is, whichever sampling bin the phase falls into may be used as the center of symmetry in one of the above-described schemes. Using this approach, it may be possible to orient the bins such that it is more likely that all of the changes (or delta values) that are transmitted have the same sign.

The approach in this example may involve first constructing an estimator of the signal, $\hat{S}_i$ for a sample i and then, carrying out a linear regression of $\hat{S}_i$ to a simple phase-shifted sine wave with a constant offset A and random noise $\epsilon_i$, which may be assumed to average to 0. Such an estimator may be expressed using Equation (3) as follows:

$$\hat{S}_i = A + B * \text{Cos}\left[2 * \pi * \frac{i}{N}\right] + C * \text{Sin}\left[2 * \pi * \frac{i}{N}\right] + \epsilon_i \quad (3)$$

The sum of the squares of error (SSE) for the regression may be calculated using Equation (4):

$$SSE \equiv \sum_{i=1,N} \left(S_i - \hat{S}_i\right)^2 \quad (4)$$

$$= \sum_{i=1,N} \left(S_i - A - B * \text{Cos}\left[2 * \pi * \frac{i}{N}\right] - C * \text{Sin}\left[2 * \pi * \frac{i}{N}\right] - \epsilon_i\right)^2$$

In one or more embodiments, the regression coefficients A, B and C may be determined using Equations (5), (6) and (7), respectively:

$$A = \frac{\sum_{i=1,N} S_i}{N} \quad (5)$$

$$B = \frac{2}{N} \sum_{i=1,N} S_i * \text{Cos}\left[2 * \pi * \frac{i}{N}\right] \quad (6)$$

$$C = \frac{2}{N} \sum_{i=1,N} S_i * \text{Sin}\left[2 * \pi * \frac{i}{N}\right] \quad (7)$$

After the coefficients are determined, the SSE may be calculated. If the SSE is less than a pre-determined threshold (e.g., as set based on a given error tolerance for the transmitted data), then a symmetry point may be determined for the data using Equation (8)-(10) as follows:

$$\text{Cos}[\alpha + \beta] = \text{Cos}[\alpha] * [\beta] - \text{Sin}[\alpha] * \text{Sin}[\beta] \quad (8)$$

$$\text{Cos}[\beta] = \frac{B}{\sqrt{B^2 + C^2}} \quad (9)$$

$$\text{Sin}[\beta] = \frac{C}{\sqrt{B^2 + c^2}} \quad (10)$$

The data series that was subjected to the regression in this example may be determined using Equations (11) and (12):

$$\hat{S}_i = A + \sqrt{B^2 + C^2} * \left(\text{Cos}[\beta] * \text{Cos}\left[2 * \pi * \frac{i}{N}\right] + \text{Sin}[\beta] * \text{Sin}\left[2 * \pi * \frac{i}{N}\right]\right) + \epsilon_i \quad (11)$$

$$\hat{S}_i = A + \sqrt{B^2 + C^2} * \text{Cos}\left[2 * \pi * \frac{i}{N} + \beta\right] + \epsilon_i \quad (12)$$

Noting that $0 \leq \beta < 2*\pi$ an approximate point of symmetry of the sequence $\hat{S}_i$ can be located by selecting the value of i between 1 and N such that $$\text{Modulus}\left(2 * \pi * \frac{i}{N} + \beta, 2 * \pi\right)$$

is minimal, where the expression Modulus(A,B) is the remainder of A when divided by B.

From the form of the function, the signal will be approximately symmetric about this point. The techniques described above may be used with the point of symmetry determined in this manner. In one or more embodiments, the above-described techniques may be used to send the regression coefficients themselves instead of the data.

It should be appreciated that other types of analyses may be performed using, for example, a regression to a doubly periodic function of the sample bin number (or higher order) in a similar fashion. As the order of the periodicity increases, the opportunity to exploit symmetry to further compress the data increases (as in the examples described above). It should also be appreciated that Fourier analysis may be used in place of regression. However, for purposes of the regression example described herein, it may be assumed that only a phase offset is sought at a period of one cycle per revolution, two cycles per revolution, etc., but not simultaneously at multiple frequencies.

As described above, an optimal delta encoding scheme may be selected from among the delta encoding schemes described above, and as exemplified in FIGS. 8A-8C, based on the particular characteristics of the data and/or the formation in which the data was collected. In one or more embodiments, the optimal delta encoding scheme may be determined based on an orientation of the downhole tool with respect to the vertical direction when the data was collected within the formation. As described above, the relative direction or orientation of the downhole tool with respect to the vertical direction may be determined based on measurements acquired by one or more sensors incorporated within the downhole tool or associated drilling assembly. For example, if the orientation of the downhole tool indicates that the borehole is being drilled in a non-vertical direction, it is likely that the downhole tool will intersect formation boundaries that are not orthogonal to the borehole. If, for example, a formation boundary has been determined through prior knowledge to be a horizontal layer of the formation, the delta encoding scheme of FIG. 8C may be selected as the optimal scheme for encoding the image data collected by the downhole tool. In one or more embodiments, prior knowledge of the general trends within the formation may be available from seismic records or logs from offset wells. However, if it is not known that the boundaries will be horizontal, the more generalized scheme of FIG. 8B, as described above, may be used so as to take into account the non-horizontal aspect of the boundary. It should be appreciated that such a generalized scheme may also be applicable in cases where a vertical well intersects a non-horizontal boundary.

In some implementations, the delta encoding scheme of FIG. 8C may be selected as the optimal delta encoding scheme by default. For example, if an initial attempt to encode image data using the delta encoding scheme of FIG. 8C fails to properly encode the data, subsequent attempts may be made to encode the data using the delta encoding schemes of FIG. 8B, followed by the delta encoding scheme of FIG. 8A. It should be appreciated that the order in which the delta encoding schemes of FIGS. 8A-8C are selected for the first, second, and third attempts to encode the data may be adjusted as desired for a particular implementation.

The particular delta encoding scheme that is selected to encode the borehole image data may be identified using a predetermined number of reserved bits, e.g., one or two bits, in the encoded data stream. Even with the addition of the reserved bit(s) in the data stream or telemetry packet, the overall telemetry rate for transmitting the data to the surface may still be improved due to the additional reduction in the total size of the encoded data as a result of using an optimal delta encoding scheme selected for the particular data. For example, an optimal delta encoding scheme selected for encoding a 16-bin image of the borehole may save 8 to 16 bits, thereby making the 1 or 2 identification bits for the delta encoding scheme negligible by comparison.

Figure 9:
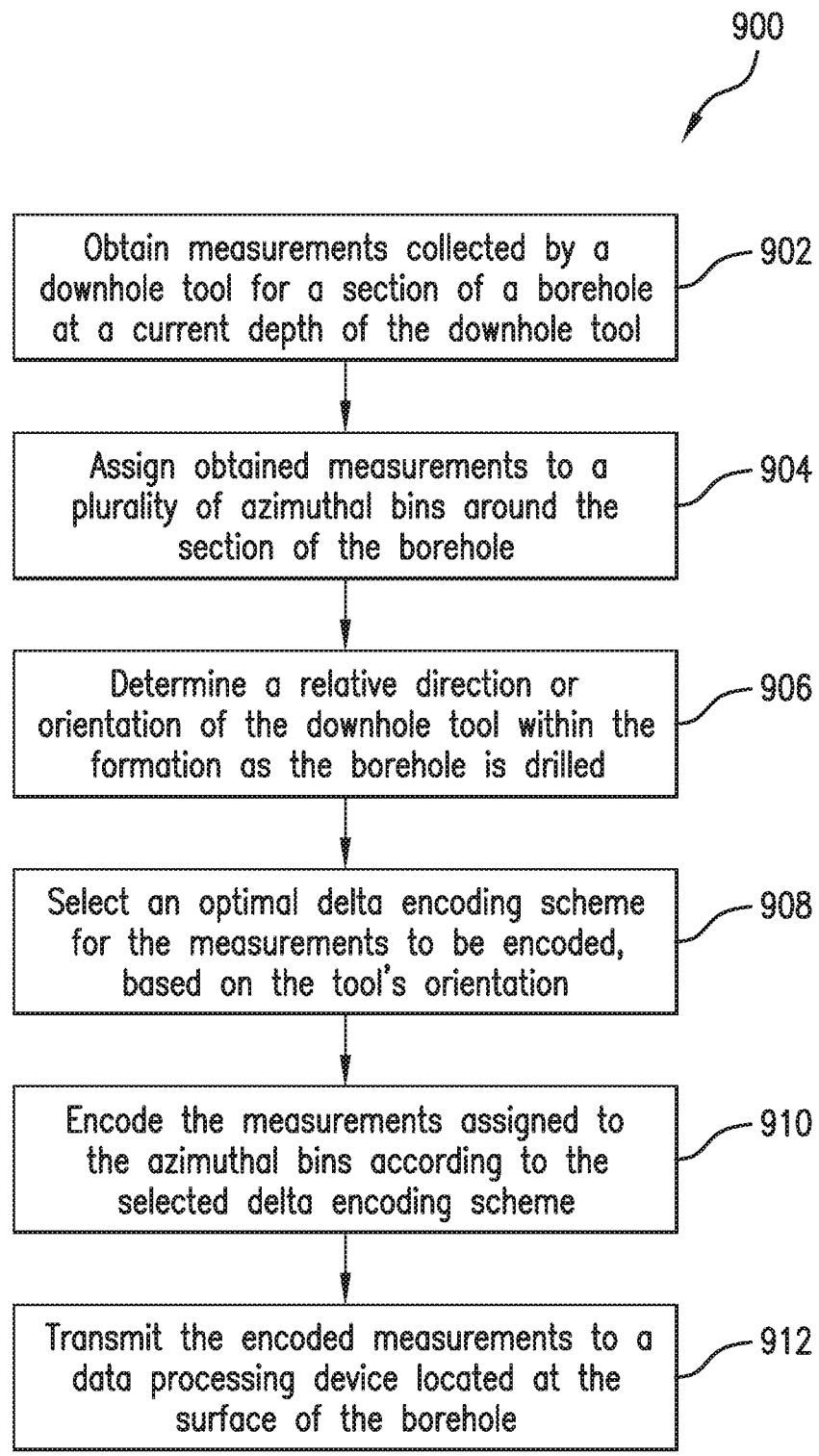
FIG. 9 is a flow chart of an illustrative process of adaptively encoding borehole image data according to an optimal delta encoding scheme selected for the data.

FIG. 9 is a flow chart of an illustrative process 900 adaptively encoding borehole image data according to an optimal delta encoding scheme selected for the particular data being encoded. For discussion purposes, process 900 will be described using drilling system 100 of FIG. 1, as described above. However, process 900 is not intended to be limited thereto. Also, for discussion purposes, process 900 will be described using telemetry device 134 of FIGS. 1 and 2, as described above, but is not intended to be limited thereto. The steps of process 900 may be performed by, for example, telemetry device 134 of FIGS. 1 and 2, as described above.

As shown in FIG. 9, process 900 begins in step 902, which includes obtaining measurements collected by a downhole tool (e.g., tool 132a or 132b of FIG. 1, as described above) for a section of a borehole at a current or other predetermined depth of the downhole tool. As described above, the measurements collected by the downhole tool may be used to obtain an image of the borehole section with respect to one or more formation characteristics at the current depth of the downhole tool. In step 904, the measurements obtained in step 902 are assigned to a plurality of azimuthal bins around the section of the borehole.

In step 906, a relative direction or orientation of the downhole tool with respect to the vertical direction is determined as the borehole is drilled within the formation. As described above, the downhole tool may include one or more positional sensors for tracking the azimuthal position of the tool within the borehole in addition to its relative orientation with respect to the vertical within the formation in which the borehole is being drilled.

In step 908, an optimal delta encoding scheme may be selected for the measurements to be encoded, based on the tool's orientation determined in step 906. In step 910, the measurements assigned to the azimuthal bins are encoded according to the delta encoding scheme selected in step 908. The delta encoded measurements may then be transmitted in step 912 to a data processing device located at the surface of the borehole.

Figure 10:
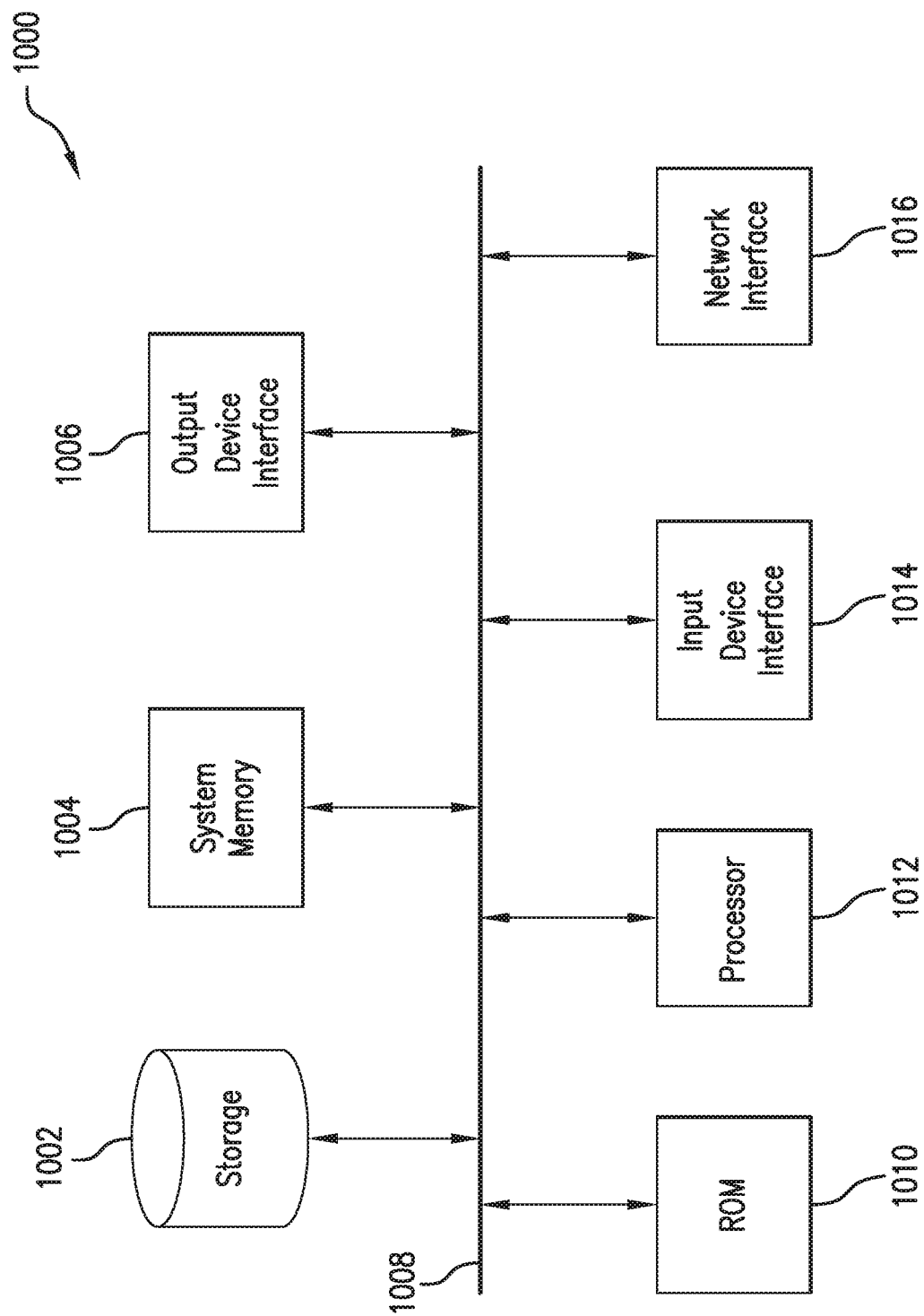
FIG. 10 is a block diagram of an illustrative computer system in which embodiments of the present disclosure may be implemented.

FIG. 10 is a block diagram of an exemplary computer system 1000 in which embodiments of the present disclosure may be implemented. For example, computer system 144 of FIG. 1, as described above, may be implemented using system 1000. Also, the steps of method 900 of FIG. 9, as described above, may be implemented using system 1000. System 1000 can be a computer or any other type of electronic device. Such an electronic device includes various types of computer readable media and interfaces for various other types of computer readable media. As shown in FIG. 10, system 1000 includes a permanent storage device 1002, a system memory 1004, an output device interface 1006, a system communications bus 1008, a read-only memory (ROM) 1010, processing unit(s) 1012, an input device interface 1014, and a network interface 1016.

Bus 1008 collectively represents all system, peripheral, and chipset buses that communicatively connect the numerous internal devices of system 1000. For instance, bus 1008 communicatively connects processing unit(s) 1012 with ROM 1010, system memory 1004, and permanent storage device 1002.

From these various memory units, processing unit(s) 1012 retrieves instructions to execute and data to process in order to execute the processes of the subject disclosure. The processing unit(s) can be a single processor or a multi-core processor in different implementations.

ROM 1010 stores static data and instructions that are needed by processing unit(s) 1012 and other modules of system 1000. Permanent storage device 1002, on the other hand, is a read-and-write memory device. This device is a non-volatile memory unit that stores instructions and data even when system 1000 is off. Some implementations of the subject disclosure use a mass-storage storage device (such as a magnetic or optical disk and its corresponding disk drive) as permanent storage device 1002.

Other implementations use a removable storage device (such as a floppy disk, flash drive, and its corresponding disk drive) as permanent storage device 1002. Like permanent storage device 1002, system memory 1004 is a read-and-write memory device. However, unlike storage device 1002, system memory 1004 is a volatile read-and-write memory, such a random access memory. System memory 1004 stores some of the instructions and data that the processor needs at runtime. In some implementations, the processes of the subject disclosure are stored in system memory 1004, permanent storage device 1002, and/or ROM 1010. For example, the various memory units include instructions for implementing the disclosed data encoding and associated decoding techniques. From these various memory units, processing unit(s) 1012 retrieves instructions and data to execute and process in order to execute the processes of some implementations.

Bus 1008 also connects to input and output device interfaces 1014 and 1006. Input device interface 1014 enables the user to communicate information and select commands to the system 1000. Input devices used with input device interface 1014 include, for example, alphanumeric, QWERTY, or T9 keyboards, microphones, and pointing devices (also called "cursor control devices"). Output device interfaces 1006 enables, for example, the display of images generated by the system 1000. Output devices used with output device interface 1006 include, for example, printers and display devices, such as cathode ray tubes (CRT) or liquid crystal displays (LCD). Some implementations include devices such as a touchscreen that functions as both input and output devices. It should be appreciated that embodiments of the present disclosure may be implemented using a computer including any of various types of input and output devices for enabling interaction with a user. Such interaction may include feedback to or from the user in different forms of sensory feedback including, but not limited to, visual feedback, auditory feedback, or tactile feedback. Further, input from the user can be received in any form including, but not limited to, acoustic, speech, or tactile input. Additionally, interaction with the user may include transmitting and receiving different types of information, e.g., in the form of documents, to and from the user via the above-described interfaces.

Also, as shown in FIG. 10, bus 1008 also couples system 1000 to a public or private network (not shown) or combination of networks through a network interface 1016. Such a network may include, for example, a local area network ("LAN"), such as an Intranet, or a wide area network ("WAN"), such as the Internet. Any or all components of system 1000 can be used in conjunction with the subject disclosure.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself. Accordingly, the steps of method 900 of FIG. 9, as described above, may be implemented using system 1000 or any computer system having processing circuitry or a computer program product including instructions stored therein, which, when executed by at least one processor, causes the processor to perform functions relating to these methods.

As used in this specification and any claims of this application, the terms "computer", "server", "processor", and "memory" all refer to electronic or other technological devices. These terms exclude people or groups of people. As used herein, the terms "computer readable medium" and "computer readable media" refer generally to tangible, physical, and non-transitory electronic storage mediums that store information in a form that is readable by a computer.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., a web page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of exemplary approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Furthermore, the exemplary methodologies described herein may be implemented by a system including processing circuitry or a computer program product including instructions which, when executed by at least one processor, causes the processor to perform any of the methodology described herein.

As described above, embodiments of the present disclosure are particularly useful for encoding downhole image data. A method for encoding downhole image data is described, where the method includes: obtaining, by a downhole computing device, measurements collected by a downhole tool around a circumference of a borehole drilled within a formation; assigning the acquired measurements to a plurality of azimuthal bins, each azimuthal bin corresponding to an angular sector around the circumference of the borehole in which at least one of the measurements was collected by the downhole tool at a predetermined depth within the formation; selecting at least one of a plurality of delta encoding schemes for the measurements assigned to the plurality of azimuthal bins to be encoded; generating a delta-encoded binary representation of the measurements assigned to the plurality of bins, based on the selected delta encoding scheme; and transmitting the generated delta-encoded binary representation from the downhole computing device to a surface computing device located at the surface of the borehole. In one or more embodiments, the method may include determining a relative orientation of the downhole tool within the formation at the predetermined depth and selecting at least one of the plurality of delta encoding schemes, based on the relative orientation of the downhole tool.

Likewise, a computer-readable storage medium is described, where the computer-readable storage medium has instructions stored therein, which when executed by a computer cause the computer to perform a plurality of functions, including functions to: obtain measurements collected by a downhole tool around a circumference of a borehole drilled within a formation; assign the acquired measurements to a plurality of azimuthal bins, each azimuthal bin corresponding to an angular sector around the circumference of the borehole in which at least one of the measurements was collected by the downhole tool at a predetermined depth within the formation; determine a relative orientation of the downhole tool within the formation at the predetermined depth; select at least one of a plurality of delta encoding schemes for the measurements assigned to the plurality of azimuthal bins to be encoded, based on the relative orientation of the downhole tool; generate a delta-encoded binary representation of the measurements assigned to the plurality of bins, based on the selected delta encoding scheme; and transmit the generated delta-encoded binary representation from the downhole computing device to a surface computing device located at the surface of the borehole.

In one or more embodiments, the foregoing method or computer-readable medium may include steps or instructions for performing functions relating to any of the following elements, either alone or in combination with each other: the downhole computing device may be a data encoder integrated within a telemetry device of a drill string disposed within the borehole; the telemetry device and the downhole tool may be components of a bottom hole assembly of the drill string; the orientation of the downhole tool may be determined based on measurements obtained from an angle sensor incorporated within the downhole tool; the angle sensor may be an accelerometer or a magnetometer; the measurements may be collected by the downhole tool at different points around the circumference of the borehole; the measurements collected by the downhole tool at each of the different points around the circumference of the borehole may include a formation property measurement and a corresponding azimuthal position of the downhole tool around the circumference when the formation property measurement was collected; the delta-encoded binary representation of the measurements may be generated by encoding the measurements based on a location of a symmetry point corresponding to at least one of the plurality of azimuthal bins; and the at least one delta encoding scheme may be selected from among the plurality of delta encoding schemes based on a measure of symmetry of the measurements around the circumference of the borehole.

Furthermore, a system for encoding downhole image data is described. The system includes at least one processor and a memory coupled to the processor, where the memory has instructions stored therein, which when executed by the processor, cause the processor to perform a plurality of functions, including functions to: obtain measurements collected by a downhole tool around a circumference of a borehole drilled within a formation; assign the acquired measurements to a plurality of azimuthal bins, each azimuthal bin corresponding to an angular sector around the circumference of the borehole in which at least one of the measurements was collected by the downhole tool at a predetermined depth within the formation; select at least one of a plurality of delta encoding schemes for the measurements assigned to the plurality of azimuthal bins to be encoded; generate a delta-encoded binary representation of the measurements assigned to the plurality of bins, based on the selected delta encoding scheme; and transmit the generated delta-encoded binary representation from the downhole computing device to a surface computing device located at the surface of the borehole.

In one or more embodiments, the foregoing system may include any of the following elements, either alone or in combination with each other: the telemetry device and the downhole tool may be components of a bottom hole assembly of the drill string; the orientation of the downhole tool may be determined based on measurements obtained from an angle sensor incorporated within the downhole tool; the angle sensor may be an accelerometer or a magnetometer; the measurements may be collected by the downhole tool at different points around the circumference of the borehole; the measurements collected by the downhole tool at each of the different points around the circumference of the borehole may include a formation property measurement and a corresponding azimuthal position of the downhole tool around the circumference when the formation property measurement was collected; the delta-encoded binary representation of the measurements may be generated by encoding the measurements based on a location of a symmetry point corresponding to at least one of the plurality of azimuthal bins; and/or the at least one delta encoding scheme may be selected from among the plurality of delta encoding schemes based on a measure of symmetry of the measurements around the circumference of the borehole.

While specific details about the above embodiments have been described, the above hardware and software descriptions are intended merely as example embodiments and are not intended to limit the structure or implementation of the disclosed embodiments. For instance, although many other internal components of the system 1000 are not shown, those of ordinary skill in the art will appreciate that such components and their interconnection are well known.

In addition, certain aspects of the disclosed embodiments, as outlined above, may be embodied in software that is executed using one or more processing units/components. Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors or the like, or associated modules thereof, such as various semiconductor memories, tape drives, disk drives, optical or magnetic disks, and the like, which may provide storage at any time for the software programming.

Additionally, the flowchart and block diagrams in the figures illustrate the architecture, functionality, and operation of possible implementations of systems, methods and computer program products according to various embodiments of the present disclosure. It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The above specific example embodiments are not intended to limit the scope of the claims. The example embodiments may be modified by including, excluding, or combining one or more features or functions described in the disclosure.

As used herein, the singular forms "a", "an" and "the" are intended to include the plural forms as well, unless the context clearly indicates otherwise. It will be further understood that the terms "comprise" and/or "comprising," when used in this specification and/or the claims, specify the presence of stated features, integers, steps, operations, elements, and/or components, but do not preclude the presence or addition of one or more other features, integers, steps, operations, elements, components, and/or groups thereof. The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the embodiments in the form disclosed. Many modifications and variations will be apparent to those of ordinary skill in the art without departing from the scope and spirit of the disclosure. The illustrative embodiments described herein are provided to explain the principles of the disclosure and the practical application thereof, and to enable others of ordinary skill in the art to understand that the disclosed embodiments may be modified as desired for a particular implementation or use. The scope of the claims is intended to broadly cover the disclosed embodiments and any such modification.

What is claimed is:

1. A method of encoding downhole image data, the method comprising:
   obtaining, by a telemetry device coupled to a drill string, measurements collected by a downhole tool of the drill string for different points around a circumference of a borehole being drilled within a formation, the measurements including values of one or more formation properties, and the downhole tool including one or more positional sensors for tracking an azimuthal position of the downhole tool within the borehole and a relative orientation of the downhole tool at a current depth of the drill string within the formation;
   storing, in a memory of the telemetry device, the measurements obtained for each point around the circumference of the borehole in association with a selected one of a plurality of azimuthal bins, the selected azimuthal bin corresponding to the azimuthal position of the downhole tool when the measurements for that point were collected by the downhole tool at the current depth of the drill string within the formation;
   analyzing, by a processor of the telemetry device, the stored measurements to identify trend characteristics of the one or more formation properties associated with the plurality of azimuthal bins;
   selecting, by the processor of the telemetry device, an optimal delta encoding scheme from among a plurality of delta encoding schemes for delta encoding the stored measurements according to an order of the plurality of azimuthal bins that reduces a size of the measurements for faster transmission to a surface of the borehole relative to other delta encoding schemes in the plurality of delta encoding schemes, based on the identified trend characteristics of the one or more formation properties at the current depth and the relative orientation of the downhole tool within the formation;
   generating, by the processor of the telemetry device, a delta-encoded binary representation of the stored measurements according to the selected optimal delta encoding scheme; and
   transmitting, by a pulse modulator of the telemetry device, the generated delta-encoded binary representation from the downhole tool to a computing device located at the surface of the borehole.

2. The method of claim 1, wherein the pulse modulator of the telemetry device is integrated within a bottom-hole assembly of the drill string disposed within the borehole.

3. The method of claim 2, wherein the telemetry device and the downhole tool are components within a housing of the bottom hole assembly of the drill string.

4. The method of claim 1, wherein the one or more positional sensors include an angle sensor incorporated within the downhole tool.

5. The method of claim 4, wherein the angle sensor is an accelerometer or a magnetometer.

6. The method of claim 1, wherein the downhole tool is at least one of a logging-while-drilling (LWD) tool or a measurement-while-drilling (MWD) tool coupled to the drill string.

7. The method of claim 6, wherein the values of the one or more formation properties included in the measurements collected by the downhole tool at each of the different points around the circumference of the borehole represent an image of a section of the borehole at the current depth of the downhole tool within the formation.

8. The method of claim 1, wherein analyzing trend characteristics includes identifying a symmetry point corresponding to at least one of the plurality of azimuthal bins.

9. The method of claim 8, wherein identifying the symmetry point comprises:
   performing a linear regression of the stored measurements by fitting the values of the one or more formation properties to a sine wave having an amplitude and a phase offset; and
   identifying the symmetry point based on the phase offset of the fitted sine wave.

10. The method of claim 1, wherein the measurements collected by the downhole tool for points around different portions of the circumference of the borehole are indicative of different layers of the formation at the current depth of the drill string.

11. A system for encoding downhole image data, the system comprising:
    a pulse modulator;
    at least one processor coupled to the pulse modulator; and
    a memory coupled to the at least one processor, the memory having instructions stored therein, which when executed by the at least one processor, cause the at least one processor to perform a plurality of functions, including functions to:
    obtain measurements collected by a downhole tool of a drill string for different points around a circumference of a borehole being drilled within a formation, the measurements including values of one or more formation properties, and the downhole tool including one or more positional sensors for tracking an azimuthal position of the downhole tool within the borehole and a relative orientation of the downhole tool at a current depth of the drill string within the formation;
    store, in the memory, the measurements obtained for each point around the circumference of the borehole in association with a selected one of a plurality of azimuthal bins, the selected azimuthal bin corresponding to the azimuthal position of the downhole tool when the measurements for that point were collected by the downhole tool at the current depth of the drill string within the formation;
    analyze the stored measurements to identify trend characteristics of the one or more formation properties associated with the plurality of azimuthal bins;
    select an optimal delta encoding scheme from among a plurality of delta encoding schemes for delta encoding the stored measurements according to an order of the plurality of azimuthal bins that reduces a size of the measurements for faster transmission to a surface of the borehole relative to other delta encoding schemes in the plurality of delta encoding schemes, based on the identified trend characteristics of the one or more formation properties at the current depth and the relative orientation of the downhole tool within the formation;
    generate a delta-encoded binary representation of the measurements according to the selected optimal delta encoding scheme; and
    transmit, using the pulse modulator, the generated delta-encoded binary representation from the downhole tool to a computing device located at the surface of the borehole.

12. The system of claim 11, wherein the delta-encoded binary representation of the measurements is generated using a data encoder integrated within a bottom-hole assembly of the drill string disposed within the borehole.

13. The system of claim 12, wherein the data encoder and the downhole tool are components of the bottom hole assembly of the drill string.

14. The system of claim 11, wherein the one or more positional sensors include an angle sensor incorporated within the downhole tool.

15. The system of claim 14, wherein the angle sensor is an accelerometer or a magnetometer.

16. The system of claim 11, wherein the values of the one or more formation properties included in the measurements collected by the downhole tool at each of the different points around the circumference of the borehole represent an image of a section of the borehole at the current depth of the downhole tool within the formation.

17. The system of claim 11, wherein the functions performed by the at least one processor further include functions to identify a symmetry point corresponding to at least one of the plurality of azimuthal bins.

18. The system of claim 17, wherein the functions performed by the processor further include functions to:
perform a linear regression of the stored measurements by fitting the values of the one or more formation properties to a sine wave having an amplitude and a phase offset; and
identify the symmetry point based on the phase offset of the fitted sine wave.

19. The system of claim 11, wherein the measurements collected by the downhole tool for points around different portions of the circumference of the borehole are indicative of different layers of the formation at the current depth of the drill string.

20. A non-transitory computer-readable storage medium having instructions stored therein, which when executed by a computer cause the computer to perform a plurality of functions, including functions to:
obtain measurements collected by a downhole tool of a drill string for different points around a circumference of a borehole being drilled within a formation, the measurements including values of one or more formation properties, and the downhole tool including one or more positional sensors for tracking an azimuthal position of the downhole tool within the borehole and a relative orientation of the downhole tool at a current depth of the drill string within the formation;
store, in a memory, the measurements obtained for each point around the circumference of the borehole in association with a selected one of a plurality of azimuthal bins, the selected azimuthal bin corresponding to the azimuthal position of the downhole tool when the measurements for that point were collected by the downhole tool at the current depth of the drill string within the formation;
analyze the stored measurements to identify trend characteristics of the one or more formation properties associated with the plurality of azimuthal bins;
select an optimal delta encoding scheme from among a plurality of delta encoding schemes for delta encoding, the stored measurements according to an order of the plurality of azimuthal bins that reduces a size of the measurements for faster transmission to a surface of the borehole relative to other delta encoding schemes in the plurality of delta encoding schemes, based on the identified trend characteristics of the one or more formation properties at the current depth and the relative orientation of the downhole tool within the formation;
generate a delta-encoded binary representation of the measurements according to the selected optimal delta encoding scheme; and
transmit, using mud pulse telemetry, the generated delta-encoded binary representation from the downhole tool to a computing device located at the surface of the borehole.

* * * * *